United States Patent
Brault

(10) Patent No.: US 6,460,225 B1
(45) Date of Patent: Oct. 8, 2002

(54) BREAKAWAY LINK OR CONNECTOR

(75) Inventor: Mark Brault, Burlington, CT (US)

(73) Assignee: Ultimate NiTi Technologies, LLC, Bristol, CT (US)

( * ) Notice: Subject to any disclaimer, the term of this patent is extended or adjusted under 35 U.S.C. 154(b) by 0 days.

(21) Appl. No.: 09/559,674

(22) Filed: Apr. 27, 2000

(51) Int. Cl.$^7$ ............................................. F16G 11/00
(52) U.S. Cl. ..................................................... 24/115 F
(58) Field of Search ............................ 24/115 F, 16 R, 24/27, 67 R, 67.3, 67.9, 546, 549, 551, 602, 598.5, 598.6; 119/864, 865; 59/84–93; 43/42.19, 43.12; 403/28, 32

(56) References Cited

U.S. PATENT DOCUMENTS

| | | | | |
|---|---|---|---|---|
| 2,485,812 A | * | 10/1949 | Buccilli | ........................ 43/43.12 |
| 2,768,468 A | * | 10/1956 | Kibler et al. | .................. 43/43.12 |
| 3,541,720 A | * | 11/1970 | Buffet | ........................ 43/42.19 |
| 3,890,800 A | * | 6/1975 | Montague | ............... 24/598.2 X |
| 3,995,598 A | * | 12/1976 | Gardner et al. | ............. 119/864 |
| 4,251,061 A | * | 2/1981 | Marshall | ........................ 254/390 |
| 4,370,783 A | * | 2/1983 | Fretwell, Jr. | ................ 24/598.2 |
| 4,716,635 A | * | 1/1988 | Flocchini | .................... 24/594.1 |
| 5,076,006 A | * | 12/1991 | Kahng | ........................ 43/43.12 |

* cited by examiner

Primary Examiner—Robert J. Sandy
Assistant Examiner—Ruth C. Rodriguez
(74) Attorney, Agent, or Firm—Alix, Yale & Ristas, LLP

(57) ABSTRACT

A breakaway link or flexible connector take the form of a short coil of wireform material having known elastic and tensile properties. The breakaway link is used to link articles in circumstances where it is desirable to have the articles separate when exposed to a pre-determined level of force. The breakaway link is a simple coil and will uncoil or release when exposed to predictable levels of force. The flexible connector is used to link articles in circumstances where some flexibility is desirable but release is not desirable. The flexible connector can be a crossed and hooked coil which will expand and/or respond predictably to a given range of force, but will resist opening until exposed to a much higher level of force. Both the breakaway link and the flexible connector are preferably constructed of known superelastic materials whose unique properties give the devices increased repeatability.

21 Claims, 9 Drawing Sheets

BREAKAWAY LINK OR CONNECTOR

BACKGROUND OF THE INVENTION

This invention relates generally to links or connectors used for mechanically linking one item to another. More particularly, the present invention relates to links or connectors designed to flex or release when exposed to a predetermined force.

Ring-type links or connectors in the form of split rings, bent wire rings, welded rings or forged chain links are well known in the art. Most of these ring-type or link connectors are intended to stay permanently closed. All of these links will open if their materials are defective, they are degraded by use or exposure to the environment or they are exposed to an excessive force. Some connecting assemblies, such as chain assemblies, are very limited in their ability to stretch and rebound in response to linear forces and fail when exposed to such forces. Other connecting assemblies, such as shock cords or bungee cords, are entirely composed of stretch materials and may not have the strength to accommodate the tension required for many applications. There is a need in the art for connecting assemblies capable of accommodating high tensions while retaining the ability to flex and rebound in response to recurring linear forces.

In some applications, the use of a non-opening link or ring-type connector is undesirable. For example, in the fishing industry, split rings, clasps, snaps, and the like are commonly used to attach fishing hooks to lures, swivels or leaders. Such devices allow the efficient replacement of hooks and the simple connection of other hardware used in the commercial and recreational fishing industries. In many applications, hooks are tied directly to the fishing line. All these methods produce a connection between the hook and the line which is much stronger than the line itself. When a hook becomes snagged on a fixed or heavy object, the most common result is failure of the fishing line at some point between where the hook is attached to the line and the fishing pole. The result is the loss of the fishing lure, the fishing line from the point of failure to the hook and the loss of all tackle including lead weights which were mounted to the lost section of line.

Such lost fishing tackle and line not only represents a financial cost to the fisherman, it also presents a significant environmental hazard. Millions of feet of fishing line and millions of lead sinkers are lost each year in streams, lakes and along the shoreline. Fishing line is typically constructed of high strength mono-filament plastic, wire, nylon and other high strength materials which do not readily decompose. Unsuspecting birds, fish, and land and marine mammals become entangled in the low visibility fishing line that is left behind beneath the water and in the trees and bushes surrounding fishing areas. Ingestion of lead is a well documented environmental problem. Lead weights that remain on the bottom of our waterways poison the food chain by contaminating the fish, waterfowl and animals that may actually ingest the lead or feed or drink close to a lead weight. There is a need in the fishing industry for an inexpensive and easily installed coupling device which will release when exposed a specified and predictable breakaway force.

Another example of an application where non-release connectors are undesirable is in the sporting goods industry. Numerous sporting goods accessories are affixed to clothing or equipment by the use of permanently closed ring-type links or connectors. Examples are ski pole straps, rifle scopes, fishing reel to rod fasteners, clips holding binoculars, hardware on hip wader suspenders and the like. An accessory or attachment using a conventional device will not give way when exposed to excessive force, potentially resulting in damage to the clothing, the equipment, or the individual wearing the equipment.

Numerous other applications utilize rigid connectors which have great linear strength but lack any linear flex. Many such applications present themselves in the automotive and marine industries. Examples are the chains used for boat anchors and devices used to attach bumpers, guards, or tie down assemblies. These devices are conventionally constructed from chains, cables, ropes or other such materials which have limited linear flexibility. As a result, these devices often lack the ability to respond to changing linear forces. These devices are either tight or loose and have limited capability to achieve and maintain an appropriate tension setting. Elastic devices commonly used, such as bungee cords or rubber cords will corrode or decay over time. Such conventional rubber-based elastic products may also lack the strength and reliability required in many heavy-duty applications in the marine and automotive industries.

SUMMARY OR THE INVENTION

Briefly stated, the invention in a preferred form is a breakaway link or flexible connector for use in place of split rings, chain links, or other conventional connectors. The breakaway link or connector comprises a short coil of wireform material having known elastic and tensile properties. The coil preferably takes on a closed shape, such as an oval or a pear shape, although open shapes may also be useful. Typically, the coil will consist of no more than two complete windings around the closed shape and will be substantially planar or flat in its structure. Articles to be joined by the breakaway link are either inserted between the coils of the closed shape in the manner of a split ring, or the article is opened and secured through the breakaway link. Articles will stay linked by the breakaway connector until a pre-determined breakaway force is applied to separate the two articles. When exposed to a breakaway force, the breakaway link will uncoil, opening the closed shape and allowing the articles to separate.

The selection and use of materials having known elastic and tensile properties allows the creation of break-away links which will separate predictably in response to particular levels of force. Break-away links may be tailored to suit a wide range of potential applications. In a fishing application, for example, the break-away link can be constructed to separate at a force level slightly less than the tensile strength of the fishing line. Thus, the breakaway link will separate before the line fails, leaving only the snagged hook behind while the fishing lure, line and all the tackle attached to the line are retrieved. Breakaway links designed for use in the sporting goods industry can be tailored to separate before clothing, accessories or individuals are damaged.

The breakaway link or connector may be constructed from materials which do not return to the original closed shape following exposure to a breakaway force. Breakaway links constructed of such materials would be single use devices. Preferably, the break-away link would be constructed from known "superelastic" materials such as Nickel Titanium, Copper Nickel Titanium, Iron Doped Nickel Titanium, Copper Aluminum Nickel, Copper Tin (Bronze), Copper Zinc (Brass), Copper Zinc alloyed with a few % by weight of Silicon, Tin or Aluminum, Nickel Aluminum, Iron Platinum, Manganese Copper and Iron Manganese Silicon. The Nickel Titanium based alloys have excellent strength, ductility and corrosion resistance, making them particularly attractive for a variety of uses. The term "superelastic" is used to describe metal alloys having the ability to withstand much higher elastic strain than ordinary alloys before permanent distortion occurs. Superelastic wires elastically deform far more easily and recover their unstressed shape more completely over a greater range of deformation than other alloys. Superelasticity gives these materials a unique combination of rubber-like elasticity and the hardness, tensile strength, ductility and shape retention of metal.

An alternative embodiment of the invention modifies the breakaway link by crossing the windings of the short coil. Bending the tips of the ends of the material ensures the ends will not slip out. When so constructed, the coil of a breakaway link will not breakaway easily. Instead, the crossed ends engage opposing sides of the coil and resist opening of the closed shape. However, the closed shape is still flexible and will respond to force in much the same way as a breakaway link. A connector so constructed will flex, increasing the distance between the points of the closed shape exposed to the force, but not release. Such a device would be most useful in applications where items are being secured and a tension is preferably maintained but release is not desirable.

The flexible connector has the advantage of flexing in response to a known range of force while maintaining its closed shape. An example of an application where such properties would be desirable is in the lacing structure of a hiking boot. Ordinary laces and eyes or hooks have a limited ability to flex in response to the walking motion, resulting in shoes which are often either too tight or too loose. Replacing standard eyes with flexible connectors of the present invention would allow the wearer to lace the boots snugly, knowing that when walking the flexible connectors will give and spring back maintaining the proper tension on the laces. Another application would be tire chains having the ability to flex and spring back with each revolution of the tire.

Either embodiment of the invention may be produced as a separate, add on device, or incorporated into an article of manufacture. For example, break-away links may be sold as a replacement item for the split rings or snap hooks used in the fishing industry or break-away capabilities may be manufactured into fishing hooks, lures, leaders and other fishing equipment. Similarly, the flexible connector may be sold as an independent accessory or incorporated into particular assemblies, such as chain assemblies or hiking boots.

An object of the invention is to provide a new and improved breakaway link which releases at a known level of force.

Another object of the invention is to provide a new and improved breakaway link for securing articles where separation at pre-determined force levels is desirable.

A further object of the invention is to provide a new and improved breakaway link which releases at a pre-determined level of force, returns to its original shape and may be reused.

A further object of the invention is to provide a new and improved break-away link of cost effective design and manufacture which is easily installed in place of existing non-break-away links.

A yet further object of the invention is to provide a new and improved flexible connector which will expand in response to a known force and will return to its original shape, maintaining tension between articles attached to it.

Other objects and advantages of the invention will become apparent from the drawings and specification.

DESCRIPTION OF THE PREFERRED EMBODIMENTS

With reference to the drawings wherein like numerals represent like parts throughout the several figures, a preferred form of the breakaway link in accordance with the present invention is generally designated by the numeral 10. A preferred form of the flexible connector in accordance with the present invention is generally designated by the numeral 30.

FIGS. 1–4 illustrate a preferred embodiment of the breakaway link 10 in accordance with the present invention. Breakaway link 10 is manufactured from a length of flexible material having known elastic and tensile properties. The flexible material may take a number of wire-like forms. The term "wireform" will be used in this application to describe the many possible configurations of flexible material appropriate for use in the present invention. A "wireform" may be stranded, coaxial, twisted, strip, braided or stranded and the term also includes thin tubing forms. Additionally, the "wireform" may have many cross-sectional shapes such as: square, trapezoidal, rectangular, or round and includes forms having sharp or rounded corners.

The length of wireform material may be formed into a short, substantially planar coil with the tips 16 of the material free of the coil and held adjacent to the coil only by the elastic properties of the material. The coil may form a closed shape such as the pear shape illustrated in FIGS. 1–4. The short coil will typically have no more than two windings, although alternative configurations having more windings may be advantageous.

Figure 15:
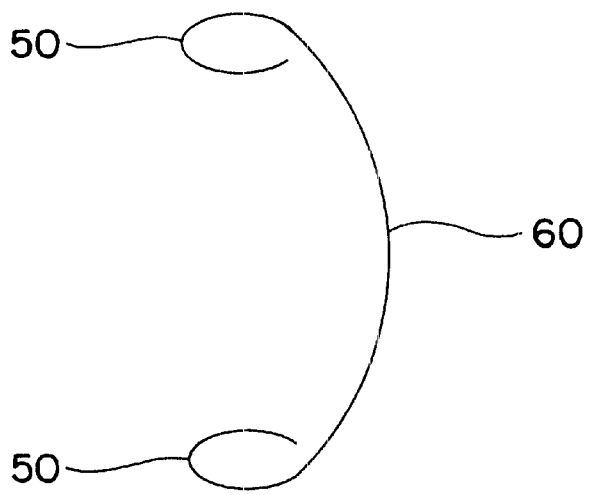
FIG. 15 is a line drawing illustrating an alternative embodiment of a breakaway link in accordance with the present invention.
Figure 16:
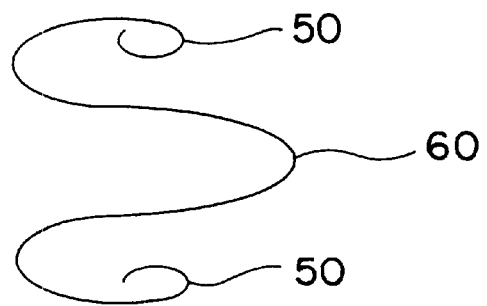
FIG. 16 is a line drawing illustrating an alternative embodiment of a breakaway link in accordance with the present invention.

The length of wireform material may also take an open shape incorporating connected concave holding surfaces. FIGS. 15 and 16 illustrate alternative embodiments 60 having an open shape which connects concave holding surfaces 50. The key to the utility of the breakaway link 10, 60 is its ability to connect articles until exposed to a breakaway force. Any shape having retention surfaces which will release predictably may be incorporated into the present invention and used as a breakaway link. The illustrated alternative embodiments 60 also have additional energy absorption built into their complex curved shapes. These curves will straighten under tension before the holding surfaces 50 begin to release.

In the embodiment of the breakaway link illustrated in FIGS. 1–4, the short coil consists of approximately 1¾ windings, leaving the tips 16 opposite each other on the sides of the closed shape, but free to move relative to the coil. A first end 12 of the breakaway link 10 will preferably consist of a single thickness or winding of coil material. A second end 14 will preferably consist of two adjacent windings of coil material. While a pear shape is illustrated in FIGS. 1–4, it must be understood that a wide range of closed shapes are appropriate for use in the construction of breakaway links in accordance with the present invention. Such shapes may be a cone shape, an hourglass shape (see FIG. 10) or a figure-eight shape, for example.

It should be understood that the elastic and tensile properties of the materials used to form both the flexible connector and the breakaway link are known and may be altered to produce predictable results. For example, a breakaway link for use in a fishing arrangement having ten pound test line may be constructed and configured to release at a force of 9½ pounds. The result is a breakaway link which will serve all fishing purposes but will release a snagged hook before failure of the fishing line.

Figure 1:
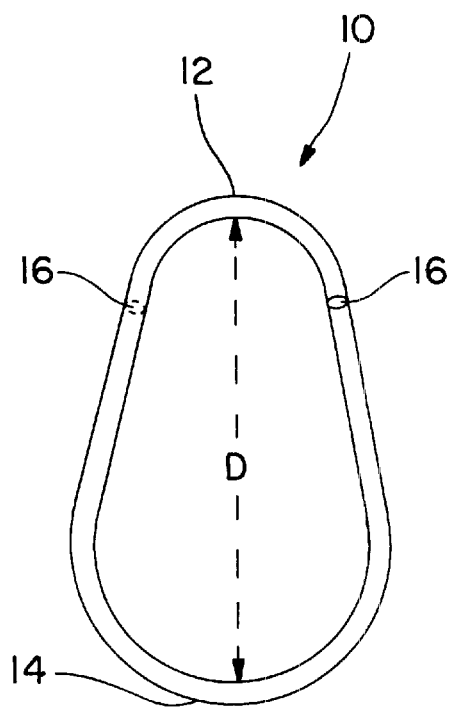
FIG. 1 is a front elevational view of a breakaway link in accordance with the present invention.
Figure 2:
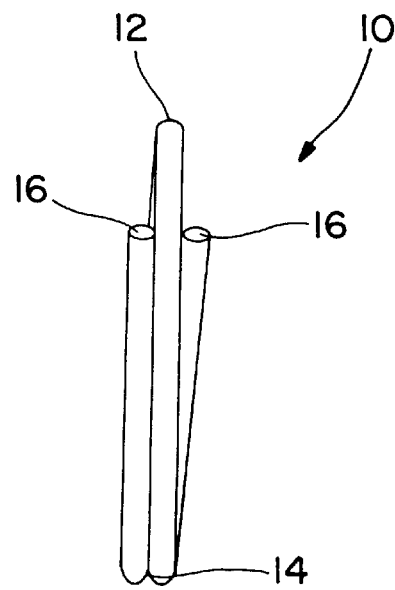
FIG. 2 is a side elevational view of the breakaway link of FIG. 1.
Figure 3:
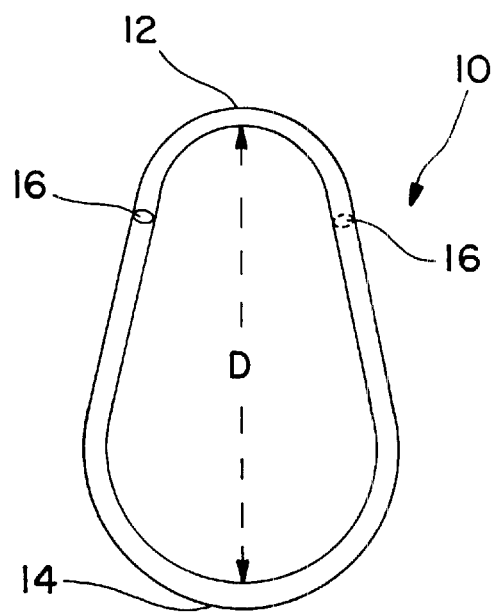
FIG. 3 is a rear elevational view of the breakaway link of FIG. 1.
Figure 4:
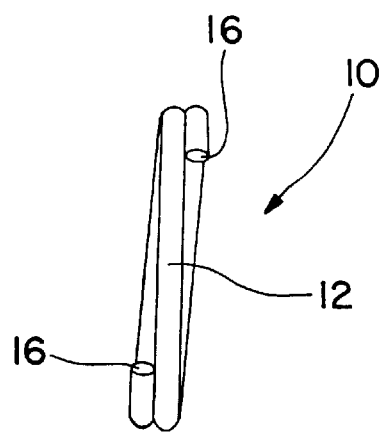
FIG. 4 is a top view of the breakaway link of FIG. 1.
Figure 5:
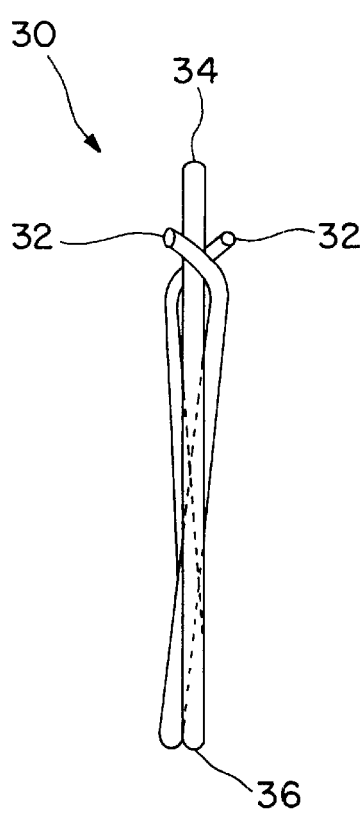
FIG. 5 is a side elevational view (partly in phantom) of a flexible connector in accordance with the present invention.
Figure 6:
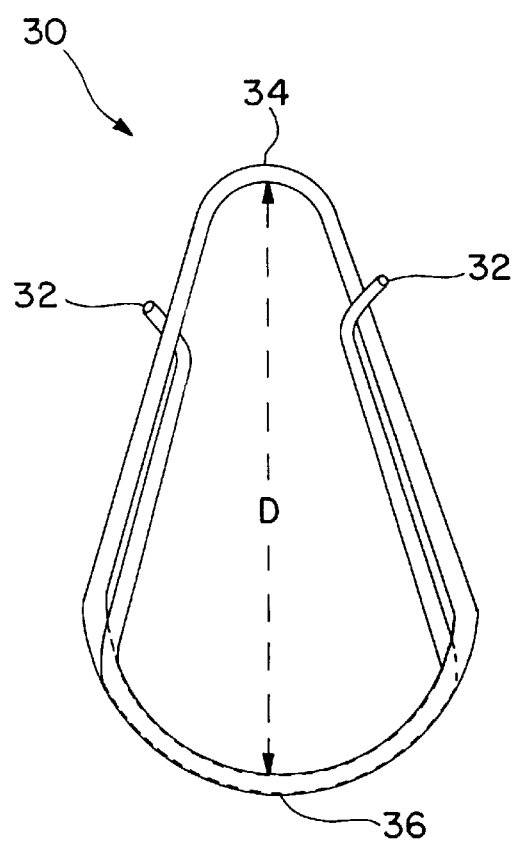
FIG. 6 is a front elevational view (partly in phantom) of the flexible connector of FIG. 5.

Similarly, a flexible connector 30, such as shown in FIGS. 5 and 6, will be constructed to be responsive to levels of force predictably found in a particular arrangement. The materials used and the form of the flexible connector 30 may be altered to produce a failure point well in excess of any predicted force and yet allow flexibility in response to those forces.

Both embodiments of the invention are preferably constructed using known superelastic materials such as Nickel Titanium, Copper Nickel Titanium, Iron Doped Nickel Titanium, Copper Aluminum Nickel, Copper Tin (Bronze), Copper Zinc (Brass), Copper Zinc doped with a few % by weight of Silicon, Tin or Aluminum, Nickel Aluminum, Iron Platinum, Manganese Copper and Iron Manganese Silicon. The term "superelastic" is a term of art used to describe the stress-strain response of certain alloys in contrast to other metals. Most metals and alloys experience plastic (irreversible) deformation at much smaller amounts of strain than superelastic alloys. Superelastic alloys have a stress-strain response (elastic modulus) about halfway between steel and rubber. The unique properties of superelastic alloys allow the production of metallic devices which display some of the elastic properties of rubber materials.

Breakaway links constructed from superelastic alloys will have the metallic properties of hardness, ductility and shape retention, yet will release predictably and return to their pre-release shape, enabling reuse.

Breakaway links and flexible connectors constructed of Nickel Titanium alloys will have high tensile strength, durability and superior corrosion resistance. Use of superelastic alloys ensures the flexible connectors will flex predictably in response to recurrent forces and return to their pre-flex shape, maintaining the tension in whatever assembly of which they are a part.

When the breakaway link 10 is exposed to a breakaway force, one end will remain closed while the opposite end will open. With reference to FIGS. 1–4, the first end 12 will remain closed, while the second end 14 will open and release whatever is attached to that end. If the breakaway link 10 is to be retrieved and reused, as is preferred, the orientation must be maintained so that the first end 12 remains attached, making retrieval possible.

Figure 8:
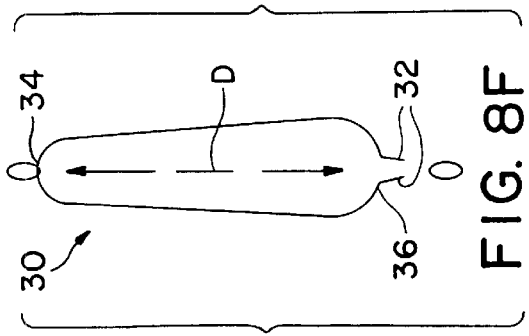
FIGS. 8A–8F are line drawings illustrating the response of the flexible connector of FIG. 5 to force applied to the connector.
Figure 10:
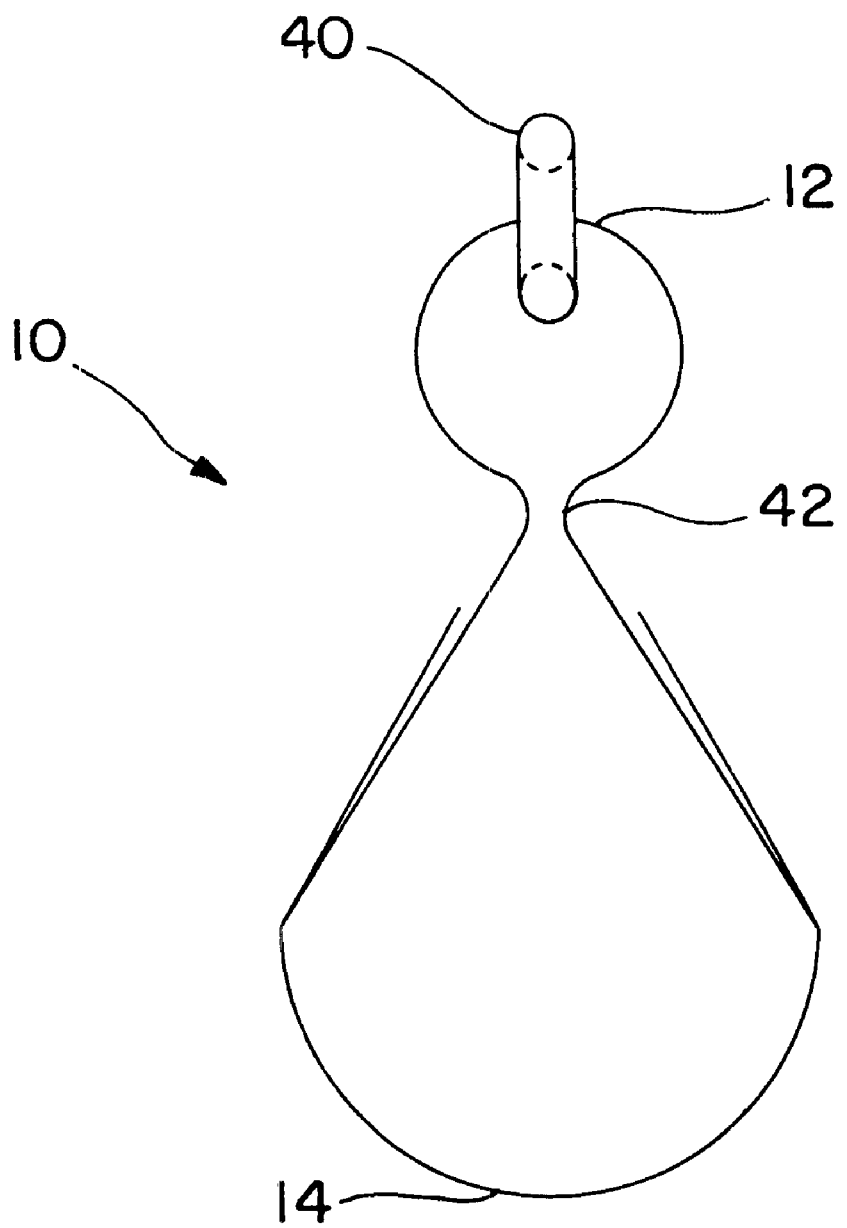
FIG. 10 is a line drawing illustrating an alternative embodiment of a breakaway link in accordance with the present invention in conjunction with a ring (partially in phantom)

FIG. 10 illustrates a preferred embodiment of a breakaway link having an hourglass shape which will achieve and maintain proper orientation of a breakaway link 10. Items secured above the narrow point of the hourglass, such as the ring 40, are restricted from moving below the narrow point of the hourglass 42. Thus, the breakaway link will remain secured to the ring 40 following release of the second end 14. Other shapes, such as a FIG. 8 shape, and various arrangements, such as rubber bands, may be used to maintain the proper orientation of a breakaway link.

FIGS. 1–4 illustrate a preferred form of breakaway link in a static condition. In a static condition the breakaway link has a distance D between the first end 12, and the second end 14. The materials and construction of the breakaway link allow the distance D to increase in response to a force applied to separate the first end 12 from the second end 14. For the purposes of description, a force applied to separate the first end 12, 34 from the second end 14, 36 of a breakaway link 10 or flexible connector 30 will be referred to as a "separation force".

The behavior of a breakaway link when it is exposed to a separation force will be best understood with reference to FIGS. 7A through 7G, and 9. FIGS. 7A–7G illustrate a breakaway link 10 attached at its first end 12 to a fishing line 20, and at its second end 14 to a fishing hook 22. The breakaway link 10 is exaggerated in size for illustrative purposes.

Figure 9:
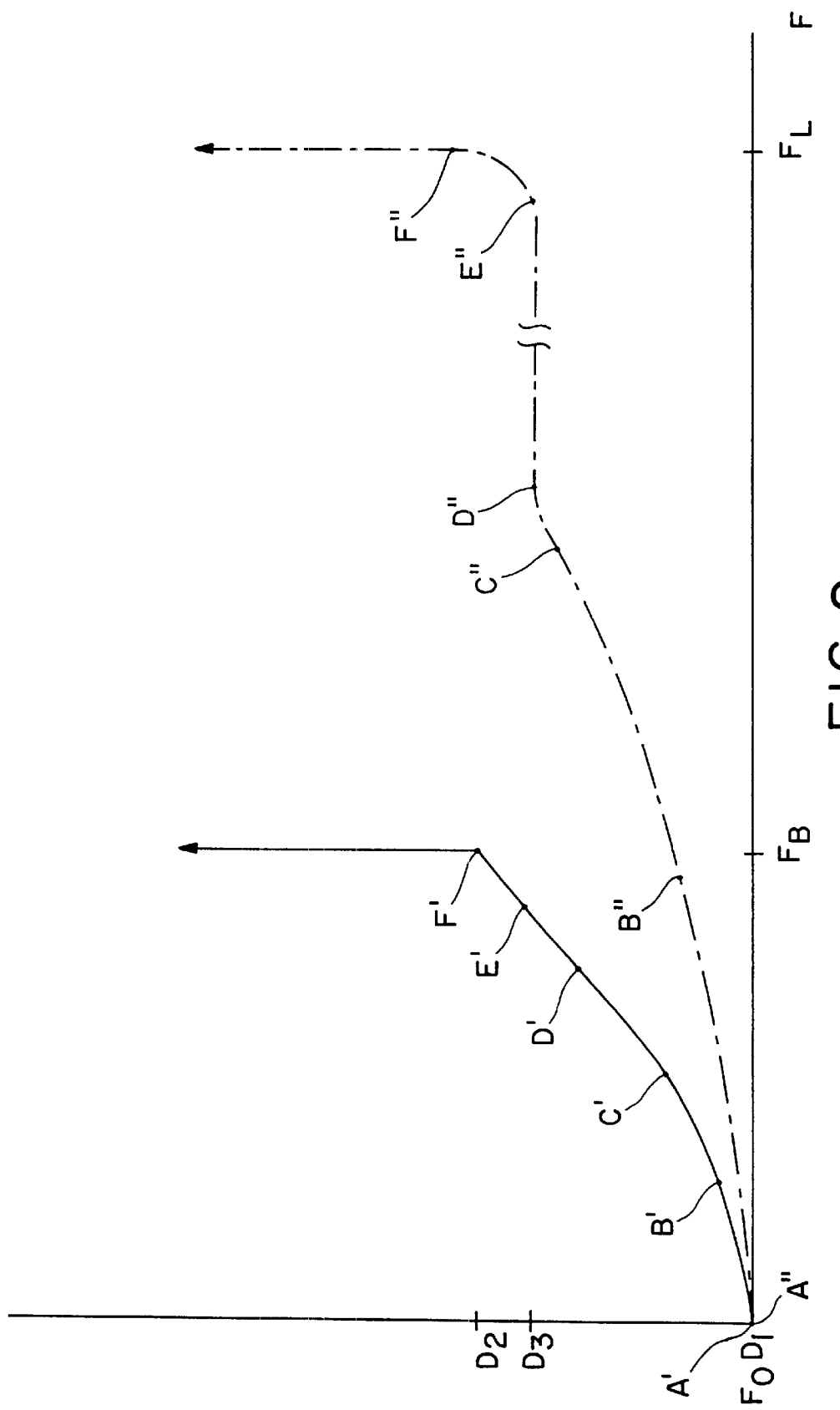
FIG. 9 is a graphic representation of the response to force of the breakaway link illustrated in FIGS. 7A–7G (solid line) and the flexible connector illustrated in FIGS. 8A–8F (broken line)

FIG. 9 is a graph in which the solid line passing through points A'–F' illustrates the relationship of the distance D between the first end 12 and the second end 14 of the breakaway link 10 to an increasing separation force F. The broken line passing through points A"–F" illustrates the relationship of the distance D between the first end 34 and the second end 36 of the flexible connector 30 to an increasing separation force F. The distance D between the first end 12, 34 and the second end 14, 36 of a breakaway link 10 or flexible connector 30 is represented along the vertical axis of the graph in FIG. 9. The horizontal axis represents the separation force F being exerted to separate the first end 12, 34 from the second end 14, 36 of a breakaway link 10 or a flexible connector 30.

Figure 7:
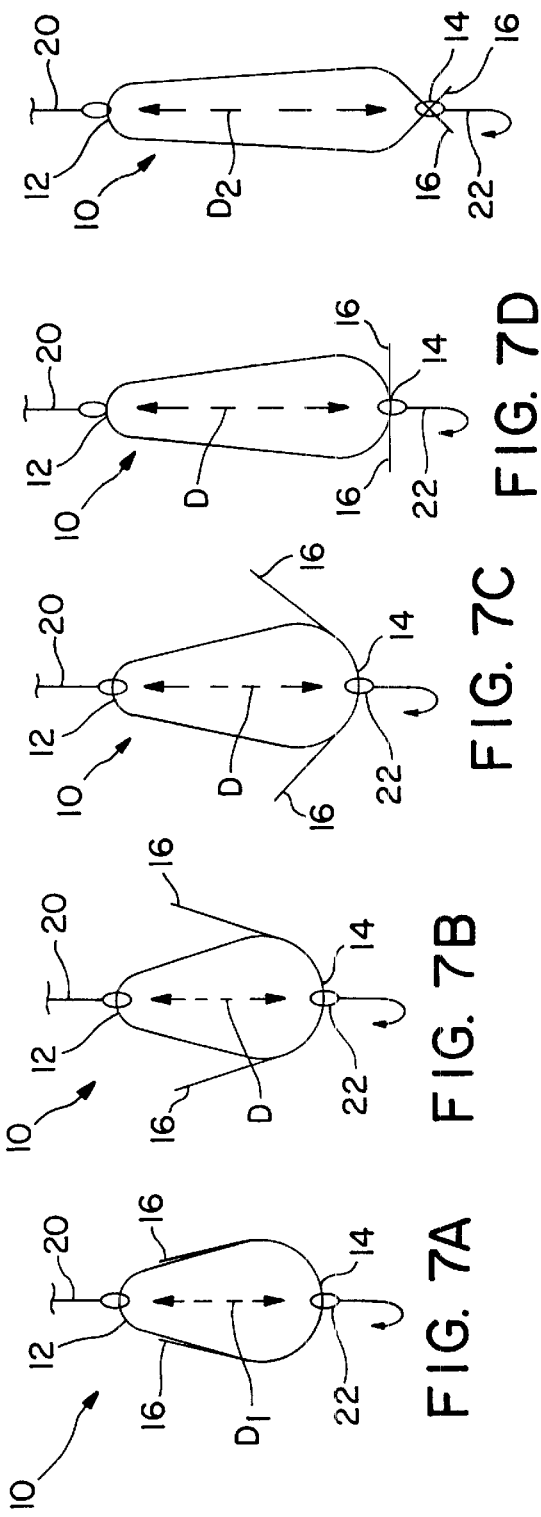
FIGS. 7A–7G are line drawings illustrating the response of the breakaway link of FIG. 1 to force from a fishing line (partially illustrated) and a fishing hook.

FIG. 7A illustrates the breakaway link 10 in an essentially static condition where little or no separation force F is being exerted between the fishing line 20 and the fishing hook 22. In this condition, the distance between the first end 12 and the second end 14 is a distance D. With reference to FIG. 9, the condition illustrated in FIG. 7A can found at the point A' located at $F_O$, $D_1$ on the graph.

FIG. 7B illustrates the elastic response of a breakaway link 10 as the force F increases. As the force F increases, the elastic material forming the closed shape of the breakaway link 10 begins to deform and the distance D between the first end 12 and the second end 14 of the breakaway link 10 increases. The curve formed by the solid line of FIG. 9 illustrates that as force F increases along the horizontal axis, the distance D also increases along the vertical axis. The elastic materials used to construct the breakaway link 10 flex in response to the increase in force F, resulting in an expansion of the closed shape of the breakaway link 10.

The first step in the shape change is illustrated in FIG. 7B. The tips 16 of the breakaway link move away from their positions adjacent to the sides of the closed shape. This movement represents the beginning of the process of uncoiling which ultimately results in opening of the closed shape. With reference to FIG. 9, point B' represents an increase in the distance D between first end 12 and second end 14, in response to an increase in separation force F applied between fishing line 20 and the fishing hook 22.

FIG. 7C and point C' of FIG. 9 illustrate an increase in the distance D in response to an increase in force F. FIG. 7C illustrates that the tips 16 continue their movement away from the sides of the breakaway link 10 as the link uncoils. FIGS. 7D and 7E further illustrate the uncoiling process of the breakaway link in response to an increasing force F. Points D' and E' of FIG. 9 illustrate the increasing distance D in response to an increasing force F.

FIG. 7F illustrates the configuration of the breakaway link 10 at the point of release. The uncoiling process is now complete. The tips 16 no longer overlap, which allows the fish hook 22 to escape from the closed shape of the breakaway link 10. Point F' of FIG. 9 graphically illustrates the breakaway point $D_2$, $F_B$. At a predetermined breakaway force $F_B$ and a maximum distance $D_2$ between the first end 12 and the second end 14, the closed shape of the breakaway link 10 opens. The distance D between first end 12 and second end 14 then becomes infinite, as illustrated by the vertical solid line from point F'.

FIG. 7G illustrates the post-release functioning of a breakaway link constructed of a preferred superelastic material. Such a breakaway link will return to its pre-release shape with the tips 16 closely adjacent to the coil, re-forming a closed shape. The breakaway link 10 remains attached to the fishing line 20 at its closed first end 12 and may be retrieved and reused.

An alternative embodiment of the present invention forms a flexible connector 30 as illustrated in FIGS. 5 and 6. The flexible connector 30 is similar in construction to a breakaway link 10 in that it is formed from a length of wireform material having known elastic and tensile properties. The flexible connector 30 begins with a short coil similar to the breakaway link 10. In the flexible connector 30, however, the tips 32 of the material are bent at an angle which allows them to engage the sides of the coil. The portions of the coil adjacent the tips 32 are crossed inside the coil with the tips 32 hooked around the sides of the closed shape as illustrated in FIGS. 5 and 6. In the flexible connector 30, the wireform material crosses itself at least once. Essentially, the wireform material is formed into a loose knot. The result is flexible connector 30 forming a closed shape and having a known flexible response to a range of separation forces. In a static condition, as illustrated in FIGS. 5 and 6, there is a distance D between the first end 34 and the second end 36 of the flexible connector 30.

It should be understood that any configuration of a wireform material which will flex but not release is suitable for use in the construction of a flexible connector. Various bent and twisted configurations of the material forming a flexible connector will vary the ability of the connector to flex as well as the ultimate strength of the connector.

FIGS. 8A–8F illustrate the response of a flexible connector 30 to an increasing separation force F. The behavior of a flexible connector 30 in response to such an increasing force F is best understood with reference to FIGS. 8A–8F and 9. In FIG. 9, the broken line passing through points A"–F" graphically illustrates the relationship of the distance D between the first end 34 and the second end 36 of the flexible connector 30 to an increasing force F.

FIG. 8A represents a flexible connector 30 in a static condition. The bent tips 32 are hooked and engaged with the sides of the coil. With reference to FIG. 9, the condition illustrated in FIG. 8A can found at the point A" located at $F_O$, $D_1$.

FIG. 8B illustrates the response of a flexible connector to an increased separation force F. The closed shape of the breakaway link expands along the lines of force, increasing the distance D between the first end 34 and the second end 36. The tips 32 of the flexible connector 30, because of their bent and hooked configuration, are not free to move away from the closed shape as are the tips 16 of the breakaway link 10, but remain engaged on the sides of the closed shape. This twisted and hooked arrangement essentially forms a knot which resists opening of the closed shape. The elastic materials used to construct the flexible connector 30 allow it to flex in response to the increased force F, resulting in an expansion of the closed shape along the lines of force. Thus, distance D will increase in response to an increase in force F over a certain range of force F.

FIGS. 8C, 8D, and 8E illustrate the response of a flexible connector to an increasing separation force F. As can be seen from FIGS. 8C–8E the closed shape of the flexible connector 30 continues to expand. However, the flexible connector 30 expands more slowly than the breakaway link 10 due to the twisted arrangement of the coil combined with the bent and hooked tips 32. At a point in its expansion the flexible connector 30 forms a knot with the coil crossing itself and the tips 32 engaged on either side of the coil, as illustrated in FIG. 8D. In this configuration the flexible connector 30 becomes highly resistant to further expansion, as illustrated by the horizontal nature of the broken line at point D".

Between points D" and E" of FIG. 9, an increasing separation force F no longer increases the distance D between the first end 34 and the second end 36. At some level of force $F_L$, however, the tensile and elastic properties of the flexible connector 30 begin to fail, as indicated by the sharp increase in distance D between points E" and F"' on FIG. 9 represent. Failure of the flexible connector 30 is illustrated in FIG. 8F. At point F"' of FIG. 9, the separation force $F_L$ exceeds the ability of the flexible connector 30 to resist that force, resulting in an opening of the closed shape and failure of the flexible connector.

It should be understood that the point of failure for any particular flexible connector 30 is predictable. Flexible connectors can be engineered to fail only at levels of force well in excess of any forces expected in a given application. For example, if a flexible connector is to be used in a chain assembly having a useful lifting strength of 1,000 lbs., then the flexible connector would be designed to have a flex range (the range between points A" and C" of FIG. 9) from 750 lbs. to 1250 lbs and a failure point of 2,000 lbs. In this manner some additional elasticity can be added to the normally inflexible chain assembly without compromising its useful strength.

The failure strength of a flexible connector 30 can be increased significantly by altering the configuration of the tips 32. If the tips are looped around the coil, rather than only bent, they will more securely engage each other when the link is stretched to its failure point. Many such modifications are possible to alter the failure point of a flexible connector in accordance with the present invention.

Figure 11:
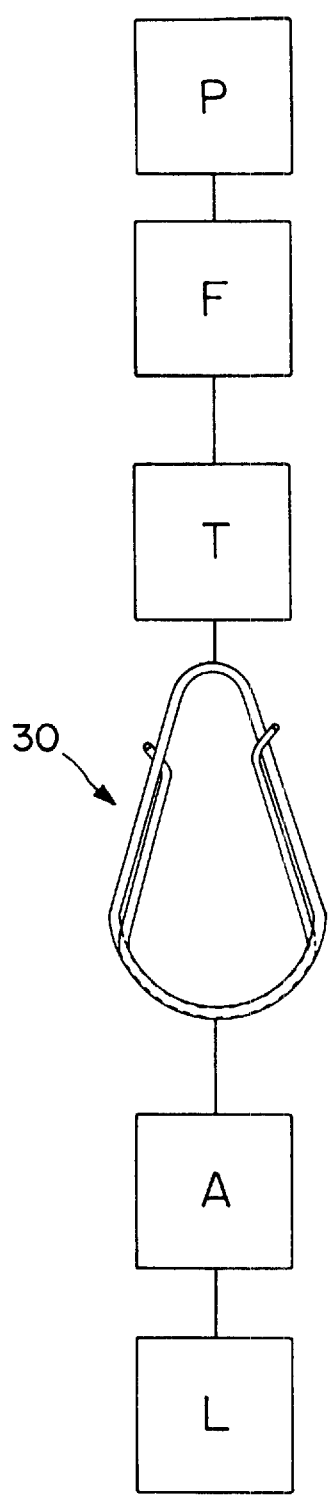
FIG. 11 is a diagrammatic representation of a flexible connector in accordance with the present invention in a functional system.
Figure 12:
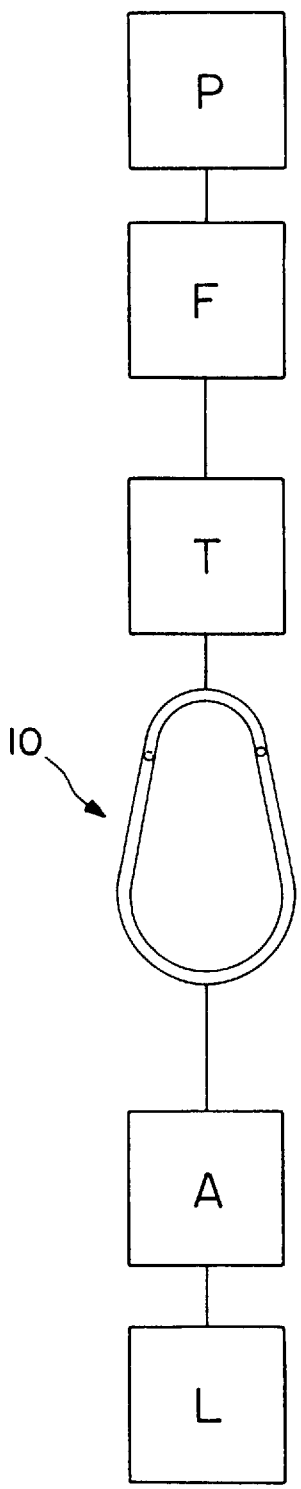
FIG. 12 is a diagrammatic representation of a breakaway link in accordance with the present invention in a functional system.

The breakaway link 10 and the flexible connector 30 may be constructed as separate devices or may be incorporated into articles or assemblies. For example, a fishing hook may be attached to a breakaway link or breakaway capabilities may be manufactured into the hook itself. In another example, a flexible connector may be sold as an add on device for a chain assembly or may be sold as part of the assembly. FIG. 11 illustrates a flexible connector 30 installed as part of the transmission means T transmitting a linearly directed force F between pulling means P and attachment means A attached to a load L. FIG. 12 illustrates a breakaway link 10 installed as part of the transmission means T transmitting a linearly directed force F between pulling means P and attachment means A attached to a load L.

FIGS. 11 and 12 are generic illustrations that use blocks to functionally represent the parts of assemblies in which the flexible connector 30 and breakaway link 10 may be used. For example, in FIG. 12 the pulling means P may be a fishing rod generating linearly directed force F and transmitting that force F via transmission means T including a fishing line and breakaway link 10 to attachment means A which may be a fishing hook attached to a load L which is hopefully a fish. In FIG. 11, in a tire snow-chain assembly the pulling means P may be the flexing of an automotive tire generating force F and transmitting that force F via transmission means T including tire chains and a flexible connector 30 to attachment means A which may be another section of tire chain attached to a load L which is the tire.

The properties of the flexible connector and breakaway link also have utility in mechanical drive assemblies. Drive assemblies for boats, recreational vehicles, cooling fans, home appliances and lawn and garden tools such as snow blowers and rotor tillers can all benefit from the energy absorption and breakaway capabilities of the breakaway link or flexible connector. All of these mechanical drives are susceptible to having their driven members jammed and of necessity they typically incorporate a release mechanism. For this purpose, many of these assemblies incorporate some form of shear pin which shears or breaks when exposed to an excessive force. Shear pins have the disadvantages of being single use items, being difficult to properly install and lacking the ability to absorb energy prior to breaking.

The drive for a boat propeller typically incorporates shear pins to mechanically separate the propeller from the drive upon impact of the propeller with a solid object such as a submerged tree stump, rock or sand bar. If properly installed, the shear pin breaks, effectively protecting the propeller and drive from further damage. An improperly installed shear pin may not shear and may fail to protect expensive drive train parts.

Figure 13:
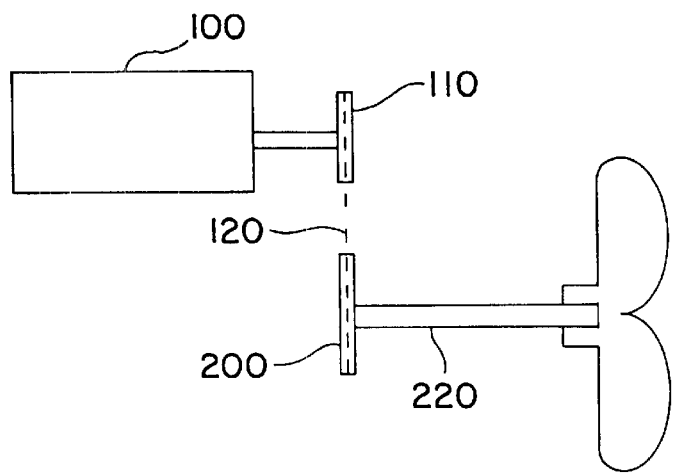
FIG. 13 is a side view of a boat drive system with a drive that incorporates breakaway links in accordance with the present invention.
Figure 14:
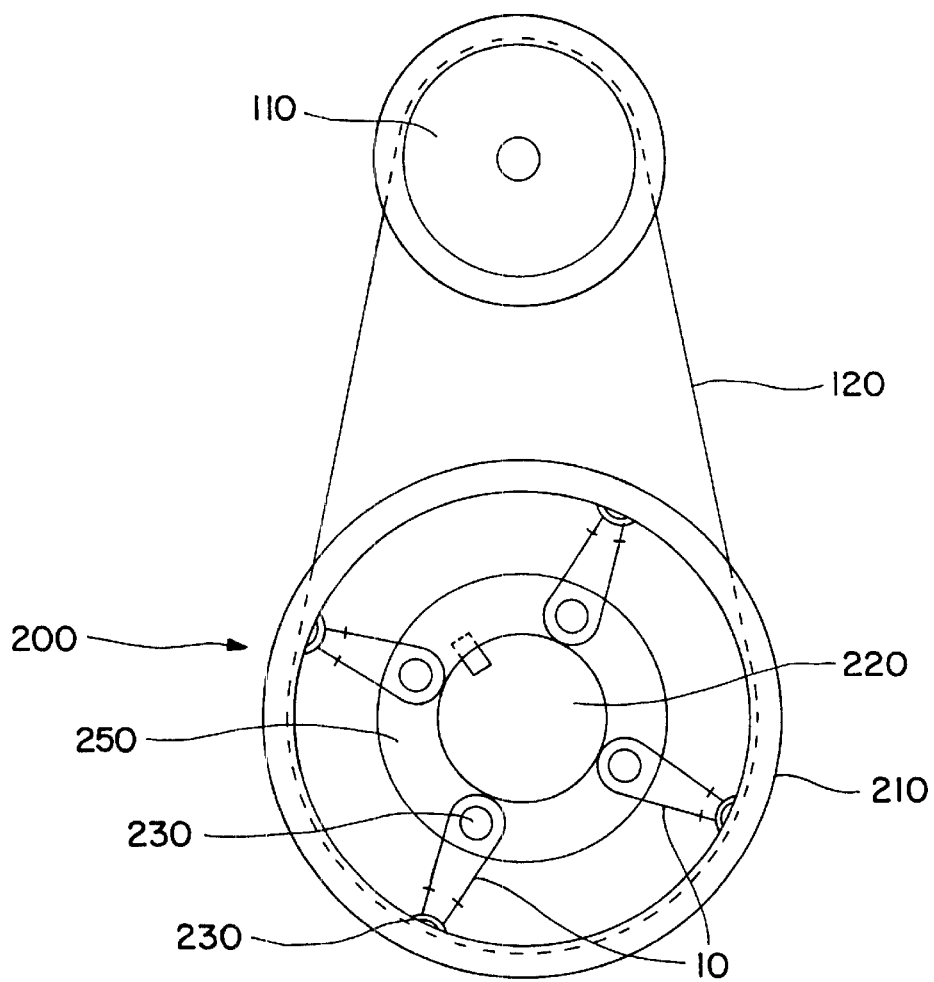
FIG. 14 is an expanded front view, partly in phantom, of the drive of FIG. 13.

FIGS. 13 and 14 illustrate a possible configuration of a propeller drive incorporating breakaway links 10, forming a force-limiting or breakaway drive. FIG. 13 illustrates the relationship between the parts of such a motor/drive system. An engine or motor 100 rotates a drive pulley or gear 110. The drive pulley or gear 110 is connected to a breakaway drive assembly 200 by a chain or belt 120. The breakaway drive assembly 200 comprises a drive ring or pulley 210 which is configured to rotate on a driven pulley 250 mounted to the drive shaft 220. The driven pulley 250 and drive ring 210 are each equipped with attachment points 230 corresponding to each end of the breakaway links 10 used in the assembly. Each breakaway link 10 transmits a portion of the rotational energy from the drive ring 210 to the driven pulley 250.

Should the drive shaft 220 be stopped for any reason, the rotational energy between the drive ring 210 and the driven pulley 250 will increase, causing the breakaway links 10 to deform and eventually, to release. If the stoppage is temporary, the breakaway links 10 will expand to absorb the excess energy and return to their pre-stress configuration when the drive shaft 220 is freed. If the stoppage is more serious, the rotational energy will quickly exceed the pre-determined release point of the breakaway link(s) 10 and the drive ring 210 will pull free of the driven pulley 250. When the drive shaft 220 has been freed, the drive ring 210 may be re-connected to the driven pulley 250 using the same breakaway links 10, which will have returned to their prerelease configuration.

The breakaway drive 200 has the capability to absorb the energy produced by temporary drive shaft jams, protecting the drive train while maintaining drive continuity. Additionally, the breakaway link components will release predictably again and again without requiring replacement. The energy absorbing characteristics of the breakaway links allow a drive train incorporating a breakaway drive to absorb the stresses produced by such events as rapid power fluctuations. Unlike shear pins, the breakaway links in the illustrated embodiment of the breakaway drive cannot be improperly installed, and thus afford an additional level of protection to users and equipment.

A similar drive assembled with the flexible connector 30 embodiment of the present invention will have the energy absorbing characteristics of the breakaway drive without its release feature, should release be undesirable. It should be understood that the embodiment illustrated in FIGS. 13 and 14 is included by way of example and not by way of limitation. Many possible drive configurations utilizing the breakaway link or flexible connector are possible.

While preferred embodiments of the foregoing invention have been set forth for purposes of illustration, the foregoing descriptions should not be deemed a limitation of the invention herein. Accordingly, various modifications, adaptations or alternatives may occur to one skilled in the art without departing from the spirit and scope of the present invention.

What is claimed is:

1. A breakaway link comprising:

a length of superelastic metal alloy wireform material having known elastic and tensile properties formed into a shape having connected concave holding portions, wherein said holding portions maintain said concavity until exposed to a pre-determined force applied in a manner and direction to separate said holding portions, and when said link is exposed to said pre-determined force, said holding portions straighten and release.

2. The breakaway link of claim 1, wherein said superelastic metal alloy wireform material is selected from the group consisting of Nickel Titanium, Copper Nickel Titanium, Iron Doped Nickel Titanium, Copper Aluminum Nickel, Copper Tin (Bronze), Copper Zinc (Brass), Copper Zinc alloyed with a few % by weight of Silicon, Tin or Aluminum, Nickel Aluminum, Iron Platinum, Manganese Copper and Iron Manganese Silicon, Nickel Titanium, Copper Nickel Titanium and Iron Doped Nickel Titanium.

3. The breakaway link of claim 2, wherein said link, upon release of said pre-determined force, will return to a configuration having concave holding portions substantially the same as said shape prior to exposure to said force.

4. The breakaway link of claim 2, wherein said shape comprises a substantially planar coil which maintains a closed shape and said coil responds to said pre-determined force by uncoiling and opening said closed shape.

5. The breakaway link of claim 4, wherein said closed shape includes a first semicircular end having a first diameter and a second semicircular end having a second greater diameter, said semicircular ends connected by two, substantially linear sides having an angular orientation to each other.

6. The breakaway link of claim 4, wherein said closed shape includes first and second semicircular ends connected by substantially linear sides which connect opposite sides of the closed shape, forming a figure-eight.

7. The breakaway link of claim 4, wherein said closed shape includes a first semicircular end having a first diameter and a second semicircular end having a second greater diameter, said ends connected by sides which curve toward the interior of the closed shape.

8. A flexible connector comprising:
a length of wireform material having first and second tips, said material being an alloy having known superelastic and tensile properties and formed into a short coil having a closed shape, a portion of said material immediately adjacent to said tips being bent substantially perpendicular to said coil, and said coil crossing itself at least once, wherein said coil maintains said closed shape until exposed to a pre-determined force applied to said coil in a manner and direction which will expand said closed shape, and when said coil is exposed to said force, said coil expands, enlarging said closed shape, and said tips each engaging a side of said closed shape forming a structure which resists the additional expansion of said closed shape.

9. The flexible connector of claim 8, wherein said closed shape is selected from a group comprising a circle, oval, pear, hourglass, figure eight, cone, triangle, circle, coil, diamond, rectangle, square and trapezoid.

10. The flexible connector of claim 8, wherein said material is a superelastic material selected from the group consisting of Nickel Titanium, Copper Nickel Titanium, Iron Doped Nickel Titanium, Copper Aluminum Nickel, Copper Tin (Bronze), Copper Zinc (Brass), Copper Zinc doped with a few % by weight of Silicon, Tin or Aluminum, Nickel Aluminum, Iron Platinum, Manganese Copper and Iron Manganese Silicon, Nickel Titanium, Copper Nickel Titanium or Iron Doped Nickel Titanium.

11. The flexible connector of claim 10, wherein, upon release of said pre-determined force, said flexible connector returns to a size and configuration substantially the same as said closed shape prior to exposure to said force.

12. A link arrangement comprising:
attachment means for securement to a load;
pulling means for generating a substantially linearly directed force;
transmission means linking the attachment means and the pulling means, for transmitting said linearly directed force through the attachment means to pull the load, and including a link member consisting of a wireform of superelastic metal alloy wound as a short coil which elastically elongates commensurate with said linearly directed force.

13. The link arrangement of claim 12, wherein the attachment means is a fishing hook, the pulling means is a fishing rod and the transmission means includes a fishing line.

14. The link arrangement of claim 12, wherein the attachment means is a chain link, the pulling means is water acting on a boat, and the transmission means includes a chain.

15. The link arrangement of claim 12, wherein the attachment means is a part of a shoe, the pulling means is an action of a foot and ankle moving within the shoe, and the transmission means includes a shoelace.

16. The link arrangement of claim 12, wherein the attachment means is a metal hook on a tie down device, the pulling means is a ratchet tightening assembly on a tie down device, and the transmission means includes a strap of a tie down assembly.

17. The link arrangement of claim 12, wherein the attachment means is a structural support member of a building, the pulling means is a motion of the building, and the transmission means includes members fixed to the support members of the building.

18. The link arrangement of claim 12, wherein the attachment means are attachment points within a force-limiting drive assembly, the pulling means is a drive member receiving rotational force, the transmission means includes a driven member and the load is work performed by said driven member.

19. The link arrangement of claim 12, wherein said metal alloy has known elastic and tensile properties and said wireform includes first and second tips, each tip of the material being free of the coil, wherein said coil responds to a pre-determined magnitude of said force by uncoiling and releasing said attachment means from said pulling means.

20. The link arrangement of claim 12, wherein said metal alloy has known elastic and tensile properties and said wireform includes first and second tips, a portion of said wireform immediately adjacent to said tips being bent substantially perpendicular to said coil, and said coil crossing itself at least once, wherein said coil responds to a pre-determined range of said force by expanding and said tips each engaging a side of said coil forming a structure which resists the uncoiling of said coil.

21. The link arrangement of claim 20, wherein the attachment means are attachment points within a shock absorbing drive assembly, the pulling means is a drive member receiving rotational force, the transmission means includes a driven member and the load is work performed by the driven member.

* * * * *